(12) United States Patent
Yoon et al.

(10) Patent No.: US 11,867,811 B2
(45) Date of Patent: *Jan. 9, 2024

(54) LIDAR DEVICE AND METHOD OF OPERATING THE SAME

(71) Applicant: SAMSUNG ELECTRONICS CO., LTD., Suwon-si (KR)

(72) Inventors: Heesun Yoon, Incheon (KR); Jungwoo Kim, Hwaseong-si (KR); Tatsuhiro Otsuka, Suwon-si (KR); Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

This patent is subject to a terminal disclaimer.

(21) Appl. No.: 17/458,660

(22) Filed: Aug. 27, 2021

(65) Prior Publication Data
US 2021/0389459 A1 Dec. 16, 2021

Related U.S. Application Data

(63) Continuation of application No. 15/870,005, filed on Jan. 12, 2018, now Pat. No. 11,131,772.

(30) Foreign Application Priority Data
Aug. 22, 2017 (KR) .......................... 10-2017-0106253

(51) Int. Cl.
*G01S 17/00* (2020.01)
*G01S 17/10* (2020.01)
(52) U.S. Cl.
CPC .................... *G01S 17/10* (2013.01)

(58) Field of Classification Search
USPC ........................................................ 356/5.01
See application file for complete search history.

(56) References Cited

U.S. PATENT DOCUMENTS

| | | |
|---|---|---|
| 6,021,375 A | 2/2000 | Urai et al. |
| 6,294,987 B1 | 9/2001 | Matsuda et al. |

(Continued)

FOREIGN PATENT DOCUMENTS

| | | | |
|---|---|---|---|
| JP | 2001083241 A | | 3/2001 |
| KR | 1020020091572 A | | 12/2002 |

(Continued)

OTHER PUBLICATIONS

Communication dated Feb. 10, 2022, issued by the Korean Intellectual Property Office in Korean Patent Application No. 10-2017-0106253.

*Primary Examiner* — James R Hulka
(74) *Attorney, Agent, or Firm* — Sughrue Mion, PLLC

(57) ABSTRACT

Provided are a LiDAR device and a method of operating the LiDAR device. The LiDAR device includes a light-emitting unit configured to emit modulated light onto an object, a light-receiving unit configured to receive the modulated light reflected by the object, a computation unit configured to calculate a distance to the object based on a reception signal of the modulated light provided by the light-receiving unit, a modulation unit configured to provide a modulation signal to the light-emitting unit to generate the modulated light, and a controller configured to control operations of at least one of the light-emitting unit, the light-receiving unit, the computation unit, and the modulation unit.

9 Claims, 6 Drawing Sheets

(56) References Cited

U.S. PATENT DOCUMENTS

| | | | |
|---|---|---|---|
| 7,130,346 B2 | 10/2006 | Midya et al. | |
| 7,333,184 B2 | 2/2008 | Kalayeh | |
| 7,652,752 B2 | 1/2010 | Fetzer et al. | |
| 7,701,382 B2 | 4/2010 | Hansen | |
| 7,711,014 B2 | 5/2010 | Jameson | |
| 7,742,152 B2 | 6/2010 | Hui et al. | |
| 8,064,491 B2 | 11/2011 | Jameson | |
| 8,325,328 B2 | 12/2012 | Renard et al. | |
| 8,408,130 B2 * | 4/2013 | Burberry | B41F 33/00 101/368 |
| 8,541,744 B1 | 9/2013 | Liu | |
| 8,659,748 B2 | 2/2014 | Dakin et al. | |
| 8,934,509 B2 | 1/2015 | Savage-Leuchs et al. | |
| 9,213,085 B2 | 12/2015 | Kanter | |
| 9,378,640 B2 | 6/2016 | Mimeault et al. | |
| 9,566,898 B2 | 2/2017 | Langkabel et al. | |
| 9,684,066 B2 | 6/2017 | Bartolome et al. | |
| 9,887,537 B2 * | 2/2018 | Wyland | G06F 3/011 |
| 9,923,329 B2 | 3/2018 | Savage-Leuchs et al. | |
| 11,131,772 B2 * | 9/2021 | Yoon | G01S 17/10 |
| 2006/0221328 A1 | 10/2006 | Rouly | |
| 2007/0002306 A1 | 1/2007 | Kalayeh | |
| 2007/0024840 A1 | 2/2007 | Fetzer et al. | |
| 2007/0091940 A1 | 4/2007 | Jameson | |
| 2007/0281638 A1 | 12/2007 | Hansen | |
| 2008/0018881 A1 | 1/2008 | Hui et al. | |
| 2009/0187781 A1 | 7/2009 | Gronemeier et al. | |
| 2010/0172381 A1 | 7/2010 | Jameson | |
| 2010/0194574 A1 | 8/2010 | Monk et al. | |
| 2010/0208244 A1 | 8/2010 | Earheart et al. | |
| 2011/0122895 A1 | 5/2011 | Savage-Leuchs et al. | |
| 2011/0181863 A1 | 7/2011 | Renard et al. | |
| 2012/0048135 A1 | 3/2012 | Burberry et al. | |
| 2013/0044309 A1 | 2/2013 | Dakin et al. | |
| 2013/0127341 A1 | 5/2013 | Langkabel et al. | |
| 2014/0232566 A1 | 8/2014 | Mimeault et al. | |
| 2014/0233942 A1 | 8/2014 | Kanter | |
| 2015/0116695 A1 | 4/2015 | Bartolome et al. | |
| 2015/0131081 A1 | 5/2015 | Soreide et al. | |
| 2015/0160340 A1 | 6/2015 | Grauer et al. | |
| 2015/0214690 A1 | 7/2015 | Savage-Leuchs et al. | |
| 2016/0277109 A1 | 9/2016 | Chaffee et al. | |
| 2017/0005465 A1 | 1/2017 | Wyland et al. | |
| 2017/0005574 A1 | 1/2017 | Wyland | |
| 2017/0120912 A1 | 5/2017 | Ishioka | |
| 2017/0235307 A1 | 8/2017 | Asakura et al. | |
| 2017/0273161 A1 | 9/2017 | Nakamura | |
| 2017/0315551 A1 | 11/2017 | Mimura et al. | |
| 2017/0317750 A1 | 11/2017 | Chaffee et al. | |
| 2018/0031703 A1 | 2/2018 | Ngai et al. | |
| 2019/0064356 A1 * | 2/2019 | Yoon | G01S 17/10 |

FOREIGN PATENT DOCUMENTS

| | | |
|---|---|---|
| KR | 10-2007-0022262 A | 2/2007 |
| KR | 1020110056747 A | 5/2011 |
| KR | 10-2015-0024860 A | 3/2015 |

\* cited by examiner (a)

(b)

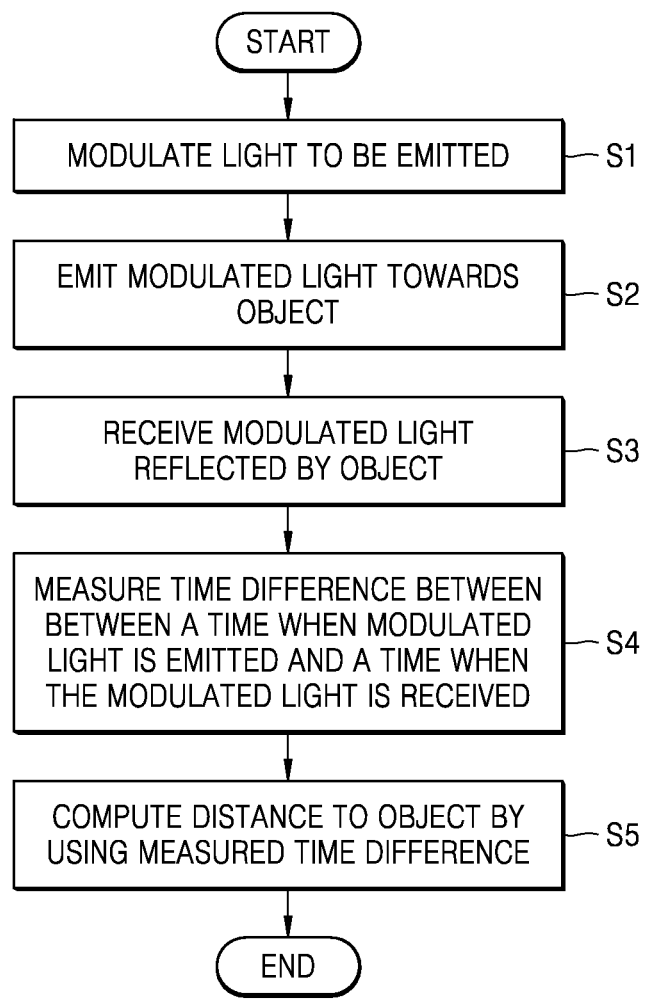

LIDAR DEVICE AND METHOD OF OPERATING THE SAME

CROSS-REFERENCE TO RELATED APPLICATION

This is a continuation of U.S. application Ser. No. 15/870,005, filed Jan. 12, 2018, which claims priority from Korean Patent Application No. 10-2017-0106253, filed on Aug. 22, 2017, in the Korean Intellectual Property Office, the disclosures of which are incorporated herein by reference in their entireties.

BACKGROUND

1. Field

Apparatuses and methods consistent with exemplary embodiments relate to distance measuring devices, and more particularly, to light detection and ranging (LiDAR) devices and methods of operating the LiDAR devices.

2. Description of the Related Art

Three-dimensional (3D) LiDAR devices for capturing 3D images may be used in a sensor for an autonomous vehicle or a motion capture sensor of a user interface. The 3D LiDAR device may be used in a depth camera for detecting depth information, a military laser radar, that is, a LADAR, or a range sensor for robot navigation.

SUMMARY

One or more exemplary embodiments may provide LiDAR devices having a crosstalk prevention function.

One or more exemplary embodiments may provide methods of operating the LiDAR devices.

Additional exemplary aspects will be set forth in part in the description which follows and, in part, will be apparent from the description, or may be learned by practice of the presented exemplary embodiments.

According to an aspect of an exemplary embodiment, a light detection and ranging (LiDAR) device includes: a modulation unit configured to output a modulation signal; a light-emitting unit configured to generate modulated light based on the modulation signal and to emit the modulated light onto an object; a light-receiving unit configured to receive the modulated light reflected by the object and generate a reception signal; a computation unit configured to calculate a distance to the object based on the reception signal; and a controller configured to control operations of at least one of the light-emitting unit, the light-receiving unit, the computation unit, and the modulation unit.

The modulated light may include a modulated single light pulse.

The modulated light may include a modulated light pulse group, and the modulated light pulse group may include a plurality of modulated single light pulses.

The modulation unit may include a light modulation device.

The computation unit may include a time-to-digital converter (TDC).

The modulated single light pulses may have pulse widths that are different from each other, and a ratio between the widths may be constant.

Gaps between the modulated single light pulses may be equal to or different from each other.

According to an aspect of another exemplary embodiment, a method of operating a LiDAR device includes: modulating light to be emitted; emitting modulated light onto an object; receiving the modulated light reflected by the object; measuring a time difference between a time at which the modulated light is emitted and a time at which the modulated light is received; and computing a distance to the object using the measured time difference.

The modulating of the light to be emitted may include applying a light emission start signal to a light-emitting unit; and applying a modulation signal to a modulation unit connected to the light-emitting unit.

The modulating of the light to be emitted may include modulating a width of the light to be emitted.

The time difference may be measured by using a TDC.

The modulated light may include a modulated single light pulse having a first cycle or a modulated light pulse group having a second cycle, where the modulated light pulse group may include a plurality of modulated light pulses.

The modulating of the width of the light to be emitted may be implemented by using a randomly generated look-up table, and a plurality of different LiDAR device may include look-up tables having different sequences from each other.

The modulating of the width of the light to be emitted may be implemented by using a unique value assigned to the LiDAR device as a parameter for modulating the width of the light pulse. The unique value may be a signal of a global positioning system (GPS) with respect to the LiDAR device.

BRIEF DESCRIPTION OF THE DRAWINGS

The above and/or other exemplary aspects and advantages will become apparent and more readily appreciated from the following description of exemplary embodiments, taken in conjunction with the accompanying drawings in which:

FIG. 9 is a flowchart for explaining a method of operating a LiDAR device, according to an exemplary embodiment.

DETAILED DESCRIPTION

Figure 1:
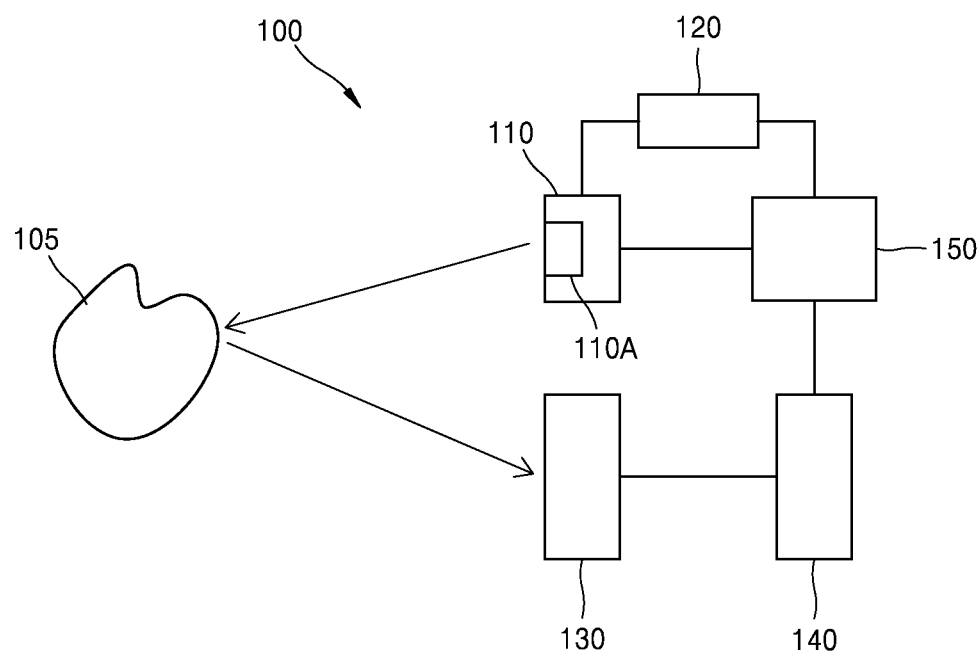
FIG. 1 is a block diagram showing a LiDAR device according to an exemplary embodiment.

A three-dimensional light detection and ranging (3D LiDAR) device according to an exemplary embodiment applies modulation to light to be made incident on an object and shares information of the modulation of the light with a light-receiving unit. Accordingly, although a variety of light is received, the light-receiving unit generates information with respect to only light emitted from the light-emitting unit. By controlling a modulation degree of a light pulse of each of a number of LiDAR devices, each of the LiDAR devices may use a unique type of light pulse, and as a result, although the LiDARs devices are simultaneously used in the same space, crosstalk between the LiDAR devices may be prevented.

Hereinafter, LiDAR devices according to the present disclosure and methods of operating the LiDAR devices will be described in detail with reference to the accompanying drawings. In the drawings, thicknesses of layers or regions may be exaggerated for clarity of explanation.

FIG. 1 is a block diagram of a LiDAR device 100 according to an exemplary embodiment.

Referring to FIG. 1, the LiDAR device 100 may include a light-emitting unit 110 configured to emit light to an object 105, a modulation unit 120, a light-receiving unit 130 configured to receive light reflected by the object 105, a computation unit 140 configured to perform a computation operation for obtaining a distance to the object 105, and a controller 150 configured to control operations of each element of the LiDAR device 100. The object 105 may be a fixed object (hereinafter, a fixed body). Alternately, the object 105 may be an object capable of moving or a moving object (hereinafter, a moving body). The object 105 may be a natural object or an artificial object. The definitions of the fixed body and the moving body may vary according to whether the LiDAR device 100 itself is fixed or moving. The light-emitting unit 110 may include a light source 110A configured to emit light towards the object 105. Light emitted from the light-emitting unit 110 towards the object 105 may be light of a pulse type (hereinafter, a light pulse). The light pulse may be periodically emitted. The light pulse may be, for example, a laser pulse. The light source 110A included in the light-emitting unit 110 may include, for example, a laser diode. The modulation unit 120 is connected to the light-emitting unit 110 and the controller 150. The modulation unit 120 may be configured to transmit a modulation signal to the light-emitting unit 110 to be applied to the light emitted therefrom. The modulation unit 120 may be directly connected to the light source 110A of the light-emitting unit 110. The modulation signal from the modulation unit 120 applied to the light emitted from the light-emitting unit 110 may be generated by using a randomly generated look-up table (LUT). Alternately, the modulation signal may be generated by using a unique value or a signal assigned to the LiDAR device 100. In this way, a unique modulation operation may be possible for each of a plurality of LiDAR devices 100, and thus, the light pulse generated by each of the LiDAR devices 100 may have a unique pattern. Accordingly, crosstalk between the LiDAR devices 100 may be prevented. The modulation unit 120 may include a light modulation device. The light-receiving unit 130 is connected to the computation unit 140. The light-receiving unit 130 receives light reflected by the object 105 to generate an electrical signal. The electrical signal generated by the light-receiving unit 130 is transmitted to the computation unit 140. The light-receiving unit 130 includes a photoelectric conversion device, for example, a photodiode, but the present exemplary embodiment is not limited thereto. The computation unit 140 may include a time-to-digital converter (TDC). The computation unit 140 may calculate a time delay of light based on an electrical signal received from the light-receiving unit 130 by using a TDC, and may thereby compute a distance from the LiDAR device 100 to the object 105. The time delay may denote a time difference between a time when light is emitted towards the object 105 from the light-emitting unit 110 and a time when the light reflected by the object 105 is received by the light-receiving unit 130. The operation of emitting light from the light-emitting unit 110 is controlled by the controller 150. The controller 150 may simultaneously transmit a light emission starting signal to the light-emitting unit 110 and the computation unit 140. In this way, the computation unit 140 may know a light emission starting time of the light-emitting unit 110. Also, since the computation unit 140 may know a light reception time of the light-receiving unit 130 based on an electrical signal provided by the light-receiving unit 130, the computation unit 140 may calculate the time delay. The computation unit 140 receives information from the controller 150 regarding a modulated light pulse emitted from the light-emitting unit 110. Based on the information, from light received by the light-receiving unit 130, the computation unit 140 calculates a time delay with respect to only the modulated light pulse emitted from the light-emitting unit 110, and may perform a distance computation operation with respect to the object 105. Distance information obtained from the computation operation of the computation unit 140 is transmitted to the controller 150. The controller 150 may control operations of other elements, that is, the modulation unit 120, the light-receiving unit 130, and the computation unit 140, through the operation of the light-emitting unit 110. The controller 150 may include a central processing unit. The controller 150 may include a personal computer (PC). The LiDAR device 100 may be applied to any of various fields, for example, autonomous devices, such as vehicles or drones, depth cameras, robot navigations, and military and medical fields. The configuration of the controller 150 may vary according to the field of application.

Figure 2:
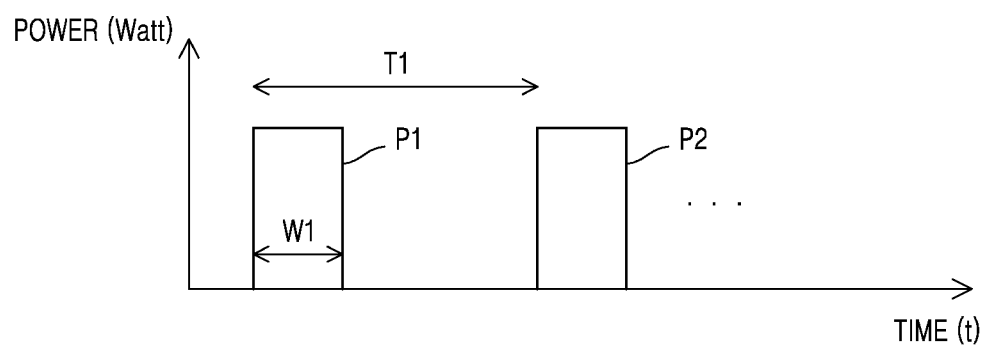
FIG. 2 shows a single light pulse before modulation, the single light pulse emitted from a light-emitting unit of FIG. 1.
Figure 3:
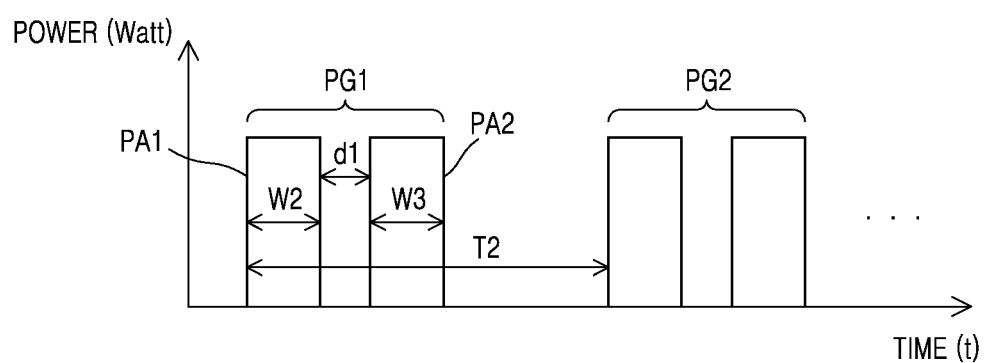
FIG. 3 shows a pulse group including a plurality of light pulses before modulation, the pulse group including a plurality of light pulses emitted from the light-emitting unit of FIG. 1.

FIG. 2 shows a single light pulse before modulation, emitted from the light-emitting unit 110 of FIG. 1. FIG. 3 shows a plurality of light pulses before modulation, emitted from the light-emitting unit of FIG. 1. For convenience, hereinafter, the light pulses are depicted with rectangular pulse shapes, though the light pulses may have a sine wave shape.

According to the present exemplary embodiment, as depicted in FIG. 2, light pulses P1 and P2 are light pulses before modulation that are emitted according to a first cycle T1 and have a first width W1. Each of the light pulses P1 and P2 is a single light pulse.

According to another exemplary embodiment, as depicted in FIG. 3, first and second light pulse groups PG1 and PG2 may be emitted before modulation and are emitted according to a second cycle T2. The first and second light pulse groups PG1 and PG2 may have the same configurations and characteristics as each other. The first light pulse group PG1 may include first and second light pulses PA1 and PA2 that together constitute a train signal. The first and second light pulses PA1 and PA2 are separated by a first distance d1. The first and second light pulses PA1 and PA2 may have the same height and respectively have a second width W2 and a third width W3. The second width W2 of the first light pulse PA1 may be equal to the third width W3 of the second light pulse PA2. As depicted in FIG. 7, the first and second light pulse groups PG1 and PG2 may each include more than two light pulses.

Figure 4:
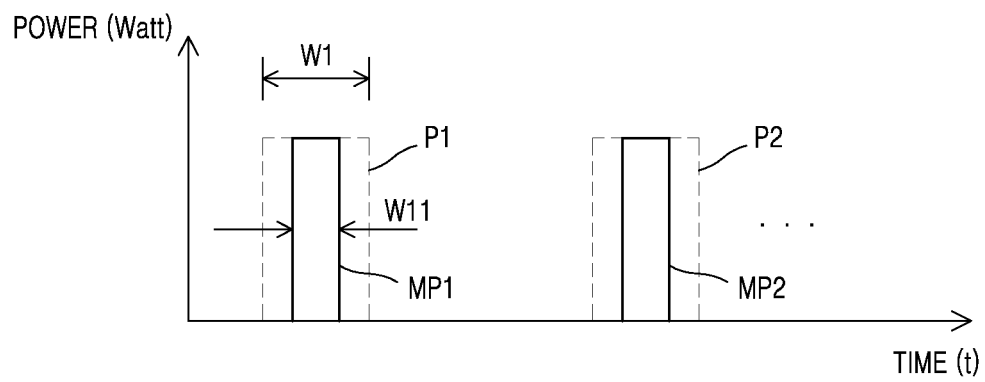
FIG. 4 shows a single light pulse having a width that is modulated by applying a modulation signal to the single light pulse of FIG. 2.

FIG. 4 shows a single light pulse, a width of which is modulated through application of a modulation signal to the single light pulse of FIG. 2.

Referring to FIG. 4, the modulated light pulses MP1 and MP2 may have the cyclic characteristics of the light pulses P1 and P2 before modulation. However, the modulated light pulses MP1 and MP2 have a width W11 that is smaller than the first width W1 of the light pulses P1 and P2 before modulation. A ratio W11/W1 of the width W11 of the modulated light pulses MP1 and MP2 with respect to the width W1of the light pulses P1 and P2 before modulation may be controlled according to the modulation signal applied to the light pulses P1 and P2. The modulation signal may be an electrical signal. The modulated light pulses MP1 and MP2 may have the same height, that is, amplitude, as that of the light pulses P1 and P2 before modulation.

Figure 5:
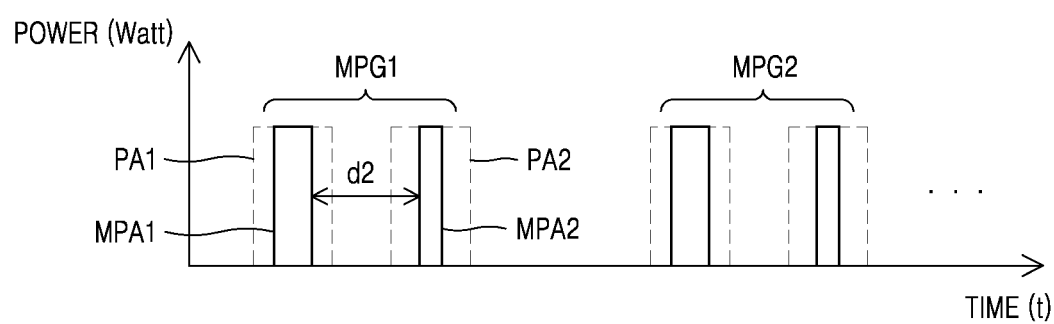
FIG. 5 shows light pulses modulated through application of a modulation signal to the light pulse of FIG. 3.

FIG. 5 shows light pulses modulated through application of a modulation signal to the light pulses of FIG. 3.

Referring to FIG. 5, a first modulated light pulse group MPG1 includes a first modulated light pulse MPA1 and a second modulated light pulse MPA2. The first modulated light pulse MPA1 and the second modulated light pulse MPA2 have widths smaller than those of the first and second light pulses PA1 and PA2 before modulation. The first modulated light pulse MPA1 and the second modulated light pulse MPA2 have widths different from each other. The first modulated light pulse MPA1 and the second modulated light pulse MPA2 are separated from each other by a second distance d2. The second distance d2 may be equal to or different from the first distance d1 of FIG. 3. A second modulated light pulse group MPG2 may have the same modulated characteristics as those of the first modulated light pulse group MPG1.

Figure 6:
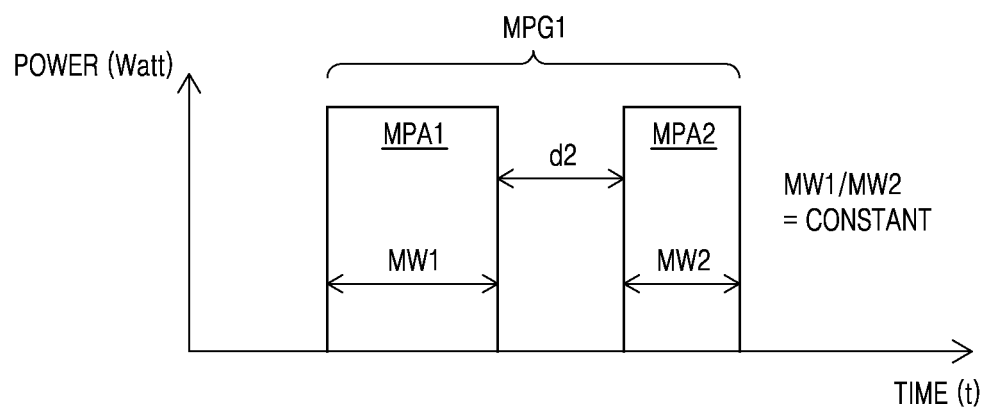
FIG. 6 shows a magnified view of a first modulated light pulse group MPG1 of FIG. 5 that is modulated.

FIG. 6 shows a magnified view of the first modulated light pulse group MPG1 of FIG. 5.

Referring to FIG. 6, the first modulated light pulse MPA1 included in the first modulated light pulse group has a width MW1 greater than a width MW2 of the second modulated light pulse MPA2 included in the first modulated light pulse group MPG1, but the reverse is also possible. In either case, a ratio MW1/MW2 of the width MW1 of the first modulated light pulse MPA1 with respect to the width MW2 of the second modulated light pulse MPA2 may be constant in all of the modulated light pulse groups MPG1 and MPG2. However, the ratio MW1/MW2 may be different in each of a plurality of LiDAR devices 100.

Figure 7A:
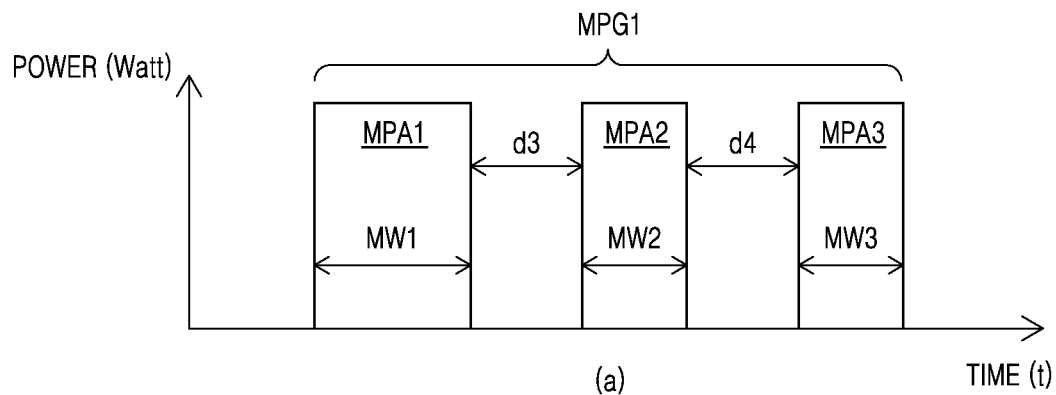
FIGS. 7A and 7B show magnified views of the first light pulse group MPG1 that is modulated, when the first light pulse group PG1 of FIG. 3 includes three light pulses.
Figure 7B:
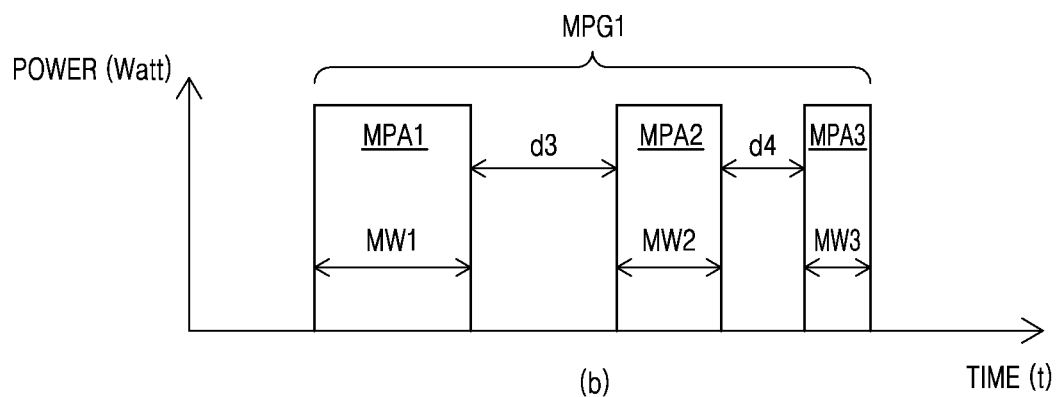

FIGS. 7A and 7B show magnified views of the first modulated light pulse group MPG1 when the first light pulse group PG1 of FIG. 3 includes three light pulses.

Referring to FIGS. 7A and 7B, gaps d3 and d4 between the first through third modulated light pulses MPA1 through MPA3 included in the first modulated light pulse group MPG1 may be equal or may be different from each other. For example, as depicted in FIG. 7A, the gaps d3 and d4 between the first through third modulated light pulses MPA1 through MPA3 may be equal to each other. As another example, as depicted in FIG. 7B, the gap d3 between the first modulated light pulse MPA1 and the second modulated light pulse MPA2 may be greater than the gap d4 between the second modulated light pulse MPA2 and the third modulated light pulse MPA3. In a case which is the reverse of FIG. 7B, the gap d3 may be smaller than the gap d4.

When more than two modulated light pulses are included in a modulated light pulse group, a width of at least one of the modulated light pulses included in the modulated light pulse group may be different from widths of the other modulated light pulses. Also, in this case, a ratio between the widths of the modulated light pulses may be constant.

As an example, as depicted in FIG. 7A, when first through third modulated light pulses MPA1 through MPA3 are included in the first modulated light pulse group MPG1, the width MW1 of the first modulated light pulse MPA1 may be greater than the widths MW2 and MW3 of the second and third modulated light pulses MPA2 and MPA3. The widths MW2 and MW3 of the second and third modulated light pulses MPA2 and MPA3 may be equal to each other.

As another example, as depicted in FIG. 7B, the widths MW1, MW2, and MW3 of the first through third modulated light pulses MPA1 through MPA3 may be different from each other.

In the case of FIG. 7A, a ratio MW1:MW2:MW3 of the widths MW1, MW2, and MW3 of the first through third modulated light pulses MPA1 through MPA3 may be constant. Also, in the case of FIG. 7B, the ratio MW1:MW2:MW3 of the widths MW1, MW2, and MW3 of the first through third modulated light pulses MPA1 through MPA3 may be constant. However, the ratio of the widths MW1, MW2, and MW3 of FIG. 7A and the ratio of the widths MW1, MW2, and MW3 of FIG. 7B are different from each other.

Figure 8:
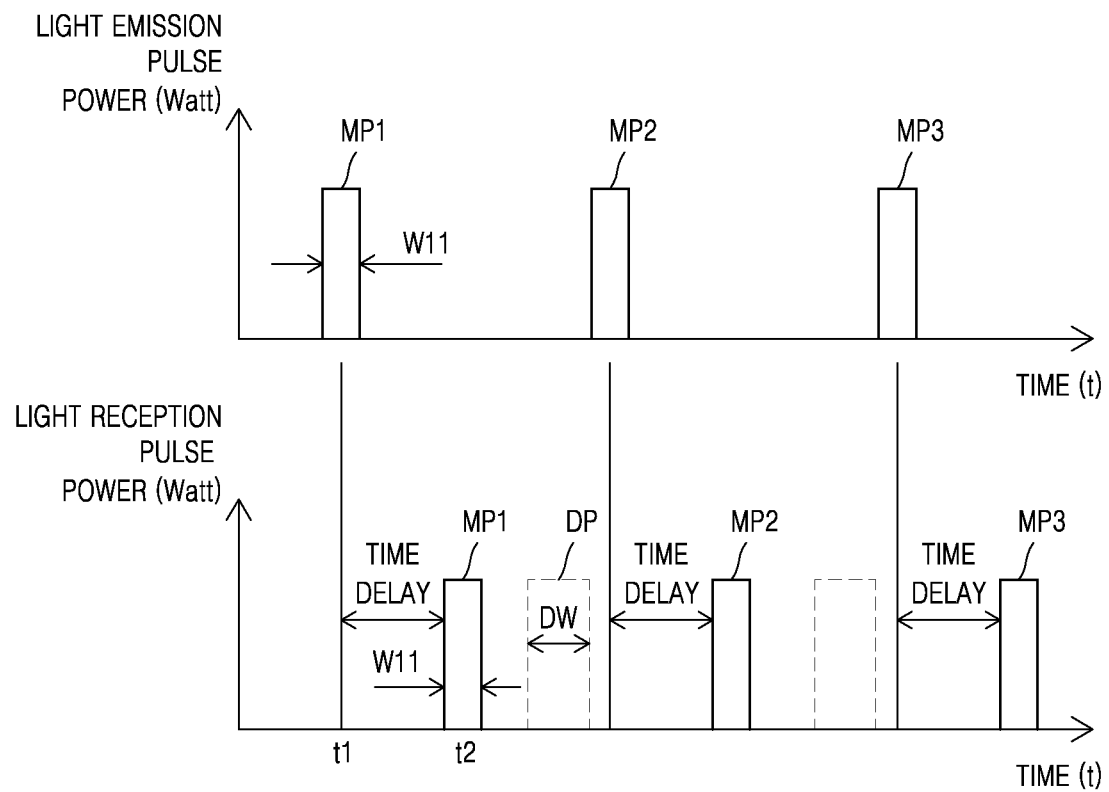
FIG. 8 is a time chart showing time delays (or time differences) between a light pulse emitted from the light-emitting unit of FIG. 1 and a modulated light pulse received by a light-receiving unit after the light pulse has been reflected by an object.

FIG. 8 is a time chart showing time delays (or time differences) between a light pulse emitted from the light-emitting unit 110 of FIG. 1 and a modulated light pulse received by the light-receiving unit 130 after the light pulse has been reflected by the object 105. The emission of light due to a light emission operation of the light-emitting unit 110 may be implemented by a light emission start signal provided from the controller 150 to the light-emitting unit 110. The light emission start signal is provided to the light-emitting unit 110 and simultaneously a modulation start signal may be provided to the modulation unit 120 from the controller 150. In this way, a modulation signal may be applied to the light-emitting unit 110 by the modulation unit 120. The light emission start signal may be simultaneously provided to the light-emitting unit 110 and the computation unit 140. In this way, the computation unit 140 may recognize a light emission start time t1. When a modulated light pulse MP1 is received by the light-receiving unit 130, an electrical pulse signal, for example, a voltage pulse signal may be generated by photoelectric conversion. The form of the electrical pulse signal may be the same as that of the modulated light pulse MP1. The generated electrical pulse signal is transmitted to the computation unit 140, and the computation unit 140 may recognize, based on the transmitted electrical pulse signal, a reception time t2 at which the modulated light pulse MP1 is received by the light-receiving unit 130. In this manner, after recognizing the emission start time t1 of the modulated light pulse MP1 and the reception time t2 of the modulated light pulse MP1, a time difference t241 between the two times t1 and t2 is calculated. The calculation may be performed by the computation unit 140, and a distance to the object 105 may be computed based on the time difference. A light pulse DP different from the modulated light pulse MP1 emitted from the light-emitting unit 110 may be received by the light-receiving unit 130. However, a width DW of the light pulse DP is different from the width W11 of the modulated light pulse MP1 emitted from the light-emitting unit 110. Information about the width DW of the light pulse DP is not provided to the computation unit 140 from the controller 150, and thus, the computation unit 140 does not measure a time delay (or a time difference) with respect to the light pulse DP received by the light-receiving unit 130.

Next, a method of operating the LiDAR device 100 according to an exemplary embodiment will be described with reference to FIG. 1.

FIG. 9 is a flowchart for explaining a method of operating the LiDAR device 100, according to an exemplary embodiment.

Referring to FIG. 9, a first operation S1 of the method of operating the LiDAR device 100 is modulating light to be emitted by the light-emitting unit 110. The first operation (S1) is an operation of modulating a width of a light pulse to be emitted from the light-emitting unit 110. As described with reference to FIG. 1, the modulation of the width of the light pulse may be implemented by using a randomly generated look-up table. Each of the LiDAR devices 100 may use a look-up table having a sequence different from each other, and thus, each LiDAR device 100 may implement a unique modulation characteristic. Accordingly, even when a plurality of LiDAR devices 100 are simultaneously used in a space, crosstalk between the LiDAR devices 100 may be avoided. As another method of modulating a width of a light pulse to be emitted, a unique value given to the LiDAR device 100 is used as a parameter for light pulse modulation. For example, when a modulation operation of a light pulse is synchronized with a LiDAR GPS signal, random parameters may be generated in real time, and thus, a light pulse may be modulated in real time.

A light pulse to be emitted may be a single light pulse having a cycle as described with reference to FIG. 4, or, as described with reference to FIGS. 5 through 7, the light pulse may be a first modulated light pulse group MPG1 having a cycle and including a plurality of modulated light pulses.

A second operation (S2) of the method of operating the LiDAR device 100 is emitting the modulated light towards the object 105. The object 105 may be a fixed body or a moving body. The definitions of the fixed body and the moving body may be relative. For example, a body may be regarded as a fixed body or a moving body according to whether the LiDAR device 100 is fixed or moving—i.e. according to whether the body is moving with respect to the LiDAR device. Thus, even if both the object 105 and the LiDAR device 100 are moving, if the distance therebetween is maintained constant, the object 105 may be regarded as a fixed body. Also, in a case in which the object 105 is a fixed structure (for example, a building, a fence of a road, or an object dropped on a road) on the ground but the LiDAR device 100 is moving, the object 105 may be regarded as a moving body with respect to the LiDAR device 100. The modulation of light to be emitted (S1) and the emission of the modulated light to the object 105 (S2) are implemented when a light emission start signal is provided to the light-emitting unit 110 by the controller 150 and when a modulation signal is provided to the modulation unit 120 by the controller 150. The light emission start signal and the modulation signal are simultaneously provided. However, since the light pulse should be emitted after modulation, the operations are therefore divided into the first operation (S1) and the second operation (S2).

A third operation (S3) of the method of operating the LiDAR device 100 is receiving modulated light reflected by the object 105 from the modulated light emitted towards the object 105. The reception of the modulated light is implemented by the light-receiving unit 130.

A fourth operation (S4) of the method of operating the LiDAR device 100 is measuring a time delay (a time difference) between a time when the modulated light pulse is emitted and a time when the modulated light pulse is received. The measuring of the time difference in the fourth operation (S4) is implemented in the computation unit 140. The computation unit 140 considers a time when a light emission start signal provided by the controller 150 is received as a light emission starting time, and considers a time when a light reception signal of the modulated light pulse provided by the light-receiving unit 130 is received as a reception time of the modulated light. A modulation characteristic (for example, information about a width of the modulated light pulse) of the modulated light pulse that is generated by providing a light emission start signal to the light-emitting unit 110 and providing a modulation signal to the modulation unit 120 by the controller 150 is provided to the computation unit 140 through the controller 150. Accordingly, among received signals provided through the light-receiving unit 130, the computation unit 140 implements a time difference measuring operation with respect to only a received signal corresponding to the modulated light pulse emitted from the light-emitting unit 110.

A fifth operation (S5) of the method of operating the LiDAR device 100 is computing a distance to the object 105 by using the time difference measured in the fourth operation (S4). The distance to the object 105 may be a distance between the object 105 and the LiDAR device 100. The distance information obtained in the fifth operation (S5) may be used to control an operation of a device (for example, an autonomous driving device) including the LiDAR device 100.

While one or more exemplary embodiments have been described with reference to the accompanying drawings, it will be understood by those of ordinary skill in the art that embodiments described herein should be considered in a descriptive sense only and not for purposes of limitation. Therefore, the scope of the inventive concept is defined not by the detailed description but by the technical scope defined by the appended claims.

What is claimed is:

1. A light detection and ranging (LiDAR) device comprising:
    a light emitter configured to emit light onto an object, the light being modulated based on a width modulation signal before being emitted to the object;
    a light receiver configured to receive the light reflected by the object and generate a first reception signal based on the received light; and
    a processor comprising a time-to-digital converter (TDC) configured to measure a time delay based on the first reception signal, in response to a pulse width of the received light corresponding to pulse width information included in the width modulation signal, wherein the processor is configured to calculate a distance to the object based on the time delay measured by the TDC.

2. The LiDAR device of claim 1, wherein the emitted light comprises a modulated single light pulse.

3. The LiDAR device of claim 1, further comprising a light modulation device configured to generate the modulated light.

4. The LiDAR device of claim 1, wherein the emitted light comprises a modulated light pulse group, and the modulated light pulse group comprises a plurality of modulated single light pulses.

5. The LiDAR device of claim 4, wherein the plurality of modulated single light pulses comprises a first single light pulse having a first width, a second single light pulse having a second width, different from the first width, and a third single light pulse having a third width, different from the first width and the second width, wherein a ratio of the first width to the second width is equal to a ratio of the second width to the third width.

6. The LiDAR device of claim 5, wherein a gap between the first single light pulse and the second single light pulse is equal to a gap between the second single light pulse and the third single light pulse.

7. The LiDAR device of claim 5, wherein a gap between the first single light pulse and the second single light pulse is different from a gap between the second single light pulse and the third single light pulse.

8. An autonomous device comprising a light detection and ranging (LiDAR) device,
   wherein the LiDAR device includes:
   a light emitter configured to emit modulated light onto an object, the modulated light being modulated to have a first modulation characteristic;
   a light receiver configured to receive the modulated light reflected by the object and a plurality of other lights without having the first modulation characteristic, generate a first reception signal based on the modulated light, and generate a plurality of other reception signals based on the plurality of other lights; and
   a processor configured to identify the first reception signal as the modulated light that is emitted from the light emitter, based on the first modulation characteristic, and calculate a distance to the object based on the first reception signal without using the plurality of other reception signals.

9. An autonomous device comprising a light detection and ranging (LiDAR) device,
   wherein the LiDAR device includes:
   a light emitter configured to emit modulated light onto an object, the light being modulated based on a width modulation signal before being emitted to the object;
   a light receiver configured to receive the light reflected by the object and generate a first reception signal based on the received light; and
   a processor comprising a time-to-digital converter (TDC) configured to measure a time delay based on the first reception signal, in response to a pulse width of the received light corresponding to pulse width information included in the width modulation signal, wherein the processor is further configured to calculate a distance to the object based on the time delay measured by the TDC.

* * * * *